Figure 1:
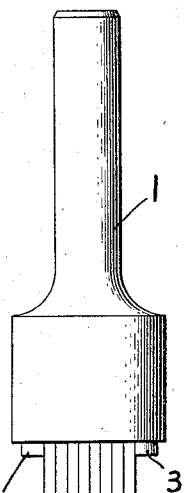

E. CAVICCHI.
BUSH HAMMER.
APPLICATION FILED MAR. 31, 1913.

1,149,115.

Patented Aug. 3, 1915.

Witnesses.
Fred. S. Greenleaf.
Joseph D. Ashe.

Inventor.
Ercole Cavicchi
by Edwards Heard & Smith
Attys.

UNITED STATES PATENT OFFICE.

ERCOLE CAVICCHI, OF QUINCY, MASSACHUSETTS.

BUSH-HAMMER.

1,149,115.  Specification of Letters Patent.  Patented Aug. 3, 1915.

Application filed March 31, 1913. Serial No. 757,801.

*To all whom it may concern:*

Be it known that I, ERCOLE CAVICCHI, a citizen of the United States, residing at Quincy, county of Norfolk, State of Massachusetts, have invented an Improvement in Bush-Hammers, of which the following description, in connection with the accompanying drawing, is a specification, like characters on the drawing representing like parts.

This invention relates to bush hammers and has for an object to provide a bush hammer which may be cheaply manufactured and which will be strong and durable.

Another object is to provide a bush hammer comprising a tool holder having a circular tapered recess and members including blades entirely filling said recess.

Another object is to provide a recessed tool holder, removable blades and filler members connected to some of the blades to move therewith so that these filler members cannot become loose and drop out.

In the drawing the preferred and best form of the invention is shown in which flat blades are provided at the sides with fillers and the assembled shanks and fillers are formed to present a cone which fits into a conical recess in the tool holder; thus the parts are securely held and the operation of the device causes the parts of the device to fit more tightly. The construction is one which lends itself to cheap and easy manufacture the bits being made flat and the assembled bits and fillers being readily turned down to the desired shape.

The invention will be fully described in the following specification taken in connection with the accompanying drawing and will be particularly pointed out in the claims.

Figure 5:
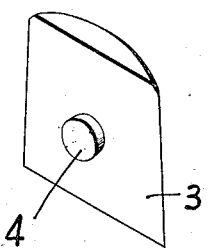
Figure 6:
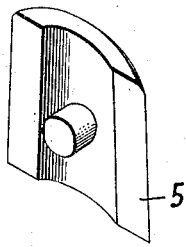
Figure 2:
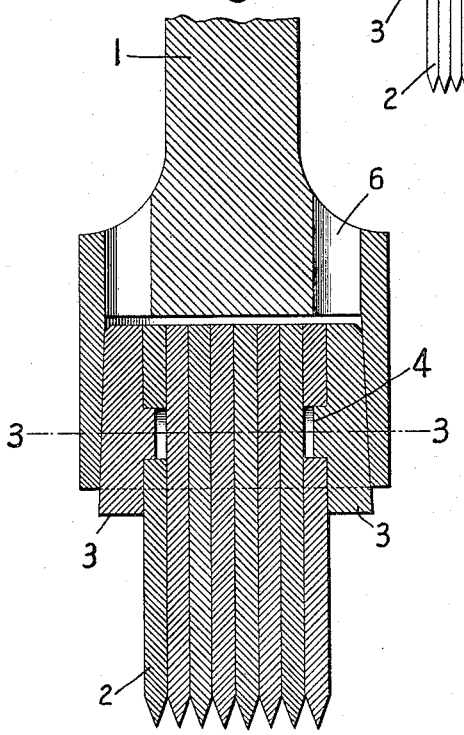
Figure 3:
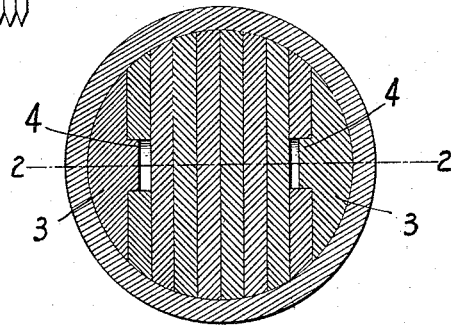
Figure 4:
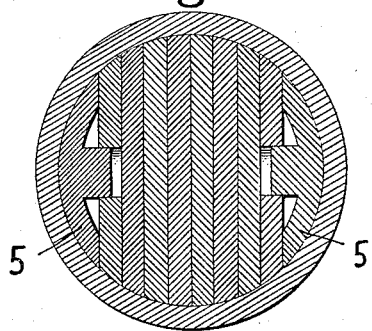

Figure 1 is a view in elevation showing the device assembled and ready for use. Fig. 2 is a sectional view of the same taken on the line 2—2 of Fig. 3. Fig. 3 is a sectional view taken on the line 3—3 of Fig. 2. Fig. 4 is a similar view showing a modified form of filler. Fig. 5 is a perspective view of the filler used in the construction shown in Fig. 3. Fig. 6 is a similar view of the filler used in the modification shown in Fig. 4.

Referring to the drawings in detail 1 indicates a tool holder having a tapered recess preferably circular in cross section which is adapted to receive blades or bits 2. It is not usually desirable to use a sufficient number of blades to entirely fill the recess and fillers 3 may be provided so that the recess will be entirely filled. Each filler may be and preferably is so connected to or interlocked with the adjacent blade that relative movement is limited or prevented. This may be done by providing the filler 3 with a lug 4 as shown in Fig. 5 which is adapted to fit in a hole provided for this purpose in the adjacent blade. The blades and fillers are so shaped that when assembled they will fit in the recess in the tool holder.

In the modification shown in Fig. 4, the filler 5 is of a different shape, being recessed on its inner side so that the filler may yield or spring to a slight extent. It will be seen that in this construction the forces tending to distort the walls of the tool holder will be more evenly distributed. In assembling the device the blades 2 are placed side by side and the fillers 3 are placed in position adjacent the blades. The blades and fillers are then inserted in the recess in the tool holder, care being taken to keep the ends of the blades 2 even so that when assembled the edges of the blades 2 will all be in a plane perpendicular to the axis of the tool holder. The blades are then forced into the tool holder until they wedge tightly therein and the tool is ready for use. In order to facilitate the removal of the blades, holes 6 are provided in the tool holder through which a pin may be inserted to drive out the fillers and the adjacent blades.

Obviously modifications may be made without departing from the spirit of the invention.

Having fully described my invention, what I claim as new and desire to secure by Letters Patent is:—

1. A bush hammer comprising a tool holder having a circular tapered recess, a plurality of flat blades having the edge surfaces of their assembled shanks shaped to conform to the shape of the circular tapered recess and a pair of fillers shaped to conform to the shape of the circular tapered recess on their outer sides and recessed on the sides toward the blades in such a manner as to bear against the blades at their edges only.

2. A bush hammer comprising a tool holder having a circular tapered recess, a plurality of blades with the edge surfaces of their assembled shanks tapered and curved to conform to the shape of the circular tapered recess whereby the assembled blades may be frictionally retained in said recess, a filler fitting against the blades and also tapered and curved to conform to the shape of the recess, whereby the assembled parts as a whole may be frictionally held in the recess.

3. A bush hammer comprising a tool holder having a tapered recess, a plurality of blades with the edge surfaces of their assembled shanks tapered to conform to the shape of the tapered recess whereby the assembled blades may be frictionally retained in said recess, a filler fitting against and connected to one of the blades whereby the assembled blades and filler may be frictionally retained in the recess.

4. A bush hammer comprising a tool holder having a conical recess, a plurality of flat blades with the edge surfaces of their assembled shanks conforming to a cone of an angle similar to that of said recess, fillers fitting against the flat sides of and connected to the exterior members of the assembled blades and having their outer surfaces of a similar conical conformation, whereby the assembled blades and fillers may be driven into and frictionally and securely held as a whole in said recess.

In testimony whereof, I have signed my name to this specification, in the presence of two subscribing witnesses.

ERCOLE CAVICCHI.

Witnesses:
B. G. MORRIS,
FREDERICK S. GREENLEAF.

Copies of this patent may be obtained for five cents each, by addressing the "Commissioner of Patents. Washington, D. C."